United States Patent [19]

Miyazaki et al.

[11] Patent Number: 5,013,620

[45] Date of Patent: May 7, 1991

[54] NONAQUEOUS ELECTROLYTE SECONDARY CELL

[75] Inventors: Tadaaki Miyazaki, Higashiyamato; Takao Ogino, Tokorozawa; Yoshitomo Masuda, Tachikawa; Hiroaki Wada, Kawasaki; Takahiro Kawagoe, Tokorozawa, all of Japan

[73] Assignee: Bridgestone Corporation, Tokyo, Japan

[21] Appl. No.: 512,446

[22] Filed: Apr. 23, 1990

[30] Foreign Application Priority Data

Apr. 26, 1989 [JP] Japan .................................. 1-106823

[51] Int. Cl.$^5$ ............................................. H01M 6/14
[52] U.S. Cl. ..................................... 429/194; 429/218
[58] Field of Search ............................... 429/194, 218; 252/182.1, 518; 423/592

[56] References Cited

U.S. PATENT DOCUMENTS

| | | | |
|---|---|---|---|
| 4,315,905 | 2/1982 | Bens et al. | 252/518 X |
| 4,340,652 | 7/1982 | Raistrick et al. | 429/218 X |

FOREIGN PATENT DOCUMENTS 3816778  5/1988  Fed. Rep. of Germany .

OTHER PUBLICATIONS

Cui et al., magnetic Resonance Study of Mixed Lithium Vanadium Oxide Conductor, 1989, Bopuxue Zazhi, 147-154, Chem. Abstracts 112(12): 10941/5.

Chemical Abstracts, vol. 111, No. 20, Nov. 13, 1989, Columbus, Oh., U.S.A. Myazaki, Tadaaki et al., "Secondary Nonaqueous Lithium Batteries", p. 237, Abstract No. 177.

*Primary Examiner*—Anthony Skapars
*Attorney, Agent, or Firm*—Oblon, Spivak, McClelland, Maier & Neustadt, P.C.

[57] ABSTRACT

A secondary cell comprising a positive electrode of an active material in the form of a lithium-containing vanadium oxide $Li_{1+x}V_3O_{8+y}$ which forms a solid solution with silicon or aluminum, a negative electrode of lithium or a lithium alloy, and a nonaqueous electrolytic solution containing lithium ions, the positive electrode has an increased capacity and improved cycle performance.

6 Claims, 1 Drawing Sheet

NONAQUEOUS ELECTROLYTE SECONDARY CELL

This invention relates to nonaqueous electrolyte secondary cells using lithium or lithium alloy as a negative electrode active material, and more particularly, to nonaqueous electrolyte secondary cells having a high potential, a high energy density, and improved cycle performance.

BACKGROUND OF THE INVENTION

A number of proposals have been made on high energy density batteries using lithium as the negative electrode active material. Lithium batteries using graphite fluoride or manganese dioxide as the positive electrode active material have been marketed. All these batteries, however, were primary batteries which could not be recharged.

As to secondary batteries using lithium as the negative electrode active material, it was proposed to use chalcogenides (e.g., sulfides, selenides, and tellurides) of titanium, molybdenum, niobium, vanadium, and zirconium as the positive electrode active material. Few batteries have been used in practice because these cells do not always have satisfactory cell performance and economy. Although a secondary battery using molybdenum sulfide as the positive electrode active material was commercially manufactured in the recent years, it still suffered from low discharge potential and overcharge failure. Lithium-containing vanadium oxide of the formula $Li_{1+x}V_3O_8$ wherein $x=0.05$ or $0.2$ is known as a positive electrode active material having a high discharge potential. A secondary battery using this oxide as the positive electrode was proposed in J. Electro. chem. Soc., Vol. 133, No. 12, 2454–2458 (1986). However, this secondary battery experienced a substantial loss of capacity during charge/discharge cycles, as demonstrated by a capacity reduction of about 50% after about 20 cycles. Its life is too short as the commercial battery. There is a need for a stable, reliable lithium secondary battery featuring a high energy density and a long charge/discharge cycle life.

SUMMARY OF THE INVENTION

Therefore, an object of the present invention is to provide a novel and improved nonaqueous electrolyte secondary cell having an increased capacity and a high potential and exhibiting improved cycle performance and stable charge/discharge operation.

The inventors have found that a secondary cell having a high potential, a high energy density, and improved cycle performance can be accomplished when a lithium-containing vanadium oxide of the formula: $Li_{1+x}V_3O_{8+y}$ wherein $0 \leq x \leq 0.6$ and $-0.5 \leq y \leq 0.3$ which forms a solid solution with an Si or Al component is used as a positive electrode active material in a cell comprising a negative electrode active material of lithium or a lithium alloy and a nonaqueous electrolytic solution containing lithium ions.

We made investigations on the lithium-containing vanadium oxide which tends to experience a large capacity reduction during charge/discharge cycles irrespective of its high potential. The cycle endurance of the lithium-containing vanadium oxide can be substantially improved by incorporating an Si or Al component such as $SiO_2$ and $Al_2O_3$ into the vanadium oxide to form a solid solution. If a positive electrode formed of this solid solution is combined with a negative electrode having a lithium or lithium alloy active material and a nonaqueous electrolytic solution, then there is constructed a secondary cell which has a high potential, a high energy density, and improved charge/discharge cycle performance. The present invention is predicated on this finding.

Briefly stated, the present invention provides a nonaqueous electrolyte secondary cell comprising a positive electrode, a negative electrode of lithium or a lithium alloy, and a nonaqueous electrolytic solution containing lithium ions. The positive electrode includes an active material in the form of a solid solution which a lithium-containing vanadium oxide of the formula: $Li_{1+x}V_3O_{8+y}$ wherein $0 \leq x \leq 0.6$ and $-0.5 \leq y \leq 0.3$ forms with an Si or Al component.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
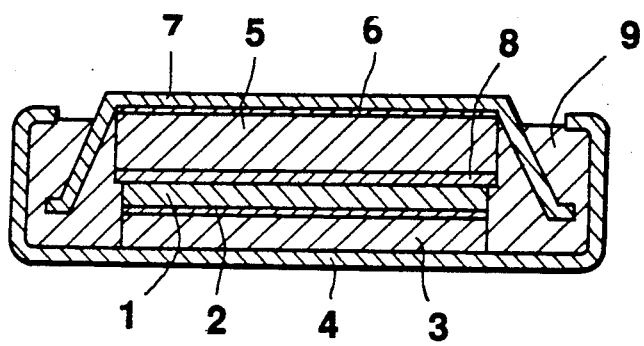
FIG. 1 is a schematic cross section of a coin type secondary cell according to one embodiment of the invention.

The positive electrode of the nonaqueous electrolyte secondary cell according to the invention includes an active material in the form of a solid solution which a lithium-containing $0 \leq x \leq 0.6$ and $-0.5 \leq y \leq 0.3$ forms with an Si or Al component.

The solvent of the solid solution is a lithium-containing vanadium oxide of the formula: $Li_{1+x}V_3O_{8+y}$ wherein $0 \leq x \leq 0.6$ and $-0.5 \leq y \leq 0.3$. This oxide may be prepared, for example, by mixing vanadium pentaoxide ($V_2O_5$) with a lithium salt and baking the mixture. The lithium salts used herein include $Li_2CO_3$, $Li_2O$, $LiNO_3$, and lithium salts of organic acids such oxalic acid and acetic acid, with $Li_2CO_3$ being preferred. The mixing ratio of vanadium oxide and lithium salt is not particularly limited, but they are generally mixed so as to give a V/Li ratio in the range of from 3:0.8 to 3:1.4, preferably from 3:0.9 to 3:1.15.

Letter x in the lithium-containing vanadium oxide $Li_{1+x}V_3O_{8+y}$ has a value of from 0 to 0.6. This value is obtained when the oxide is synthesized or charged to 3.5 V or higher. The value of x varies from 0 to about 5 during charging and discharging. The value of y varies in the range of from 0.5 to 0.3 depending on the oxidation state of vanadium (V). The preferred ranges for x and y are $0 \leq x \leq 0.1$ and $-0.3 \leq y \leq 0$.

The lithium containing vanadium oxide forms a solid solution with an Si or Al component. Most often the Si component is elemental silicon (Si) or $SiO_2$, and the Al component is elemental aluminum (Al) or $Al_2O_3$. The amount of the Si or Al component added is in the range of from 0.1 to 5 atom % relative to the vanadium (V) atoms. Preferably the Si component is added in an amount of 0.5 to 2 atom % and relative to the vanadium (V) atoms.

The method for incorporating the Si or Al component into the lithium-containing vanadium oxide to form a solid solution is not particularly limited. Preferably, in the above-mentioned process of synthesizing lithium-containing vanadium oxide $Li_{1+x}V_3O_{8+y}$ by mixing vanadium pentaoxide ($V_2O_5$) with a lithium salt and baking the mixture, a predetermined amount of the Si or Al component is added to the mixture before baking. The baking temperature is preferably 680° to 800° C., more preferably 720° to 770° C. Within this baking temperature range, there are obtained crystals which are more stable to charge/discharge reactions. The baking atmosphere is preferably air or an oxygen atmosphere.

The positive electrode is prepared using the lithium-containing vanadium oxide which has formed a solid solution with the Si or Al component as the active material. The grain size of the positive electrode material is not particularly limited although positive electrodes of better performance are obtained from powder materials having an average grain size of from 0.5 to 3 μm. The positive electrode is generally prepared by mixing the powder material with a conductive agent such as carbon black, acetylene black, and graphite and a binder such as fluorocarbon resin powder and rubber, kneading the mixture with the aid of an organic solvent, roll milling the mixture, and drying. The conductive agent is used in an amount of about 3 to about 25 parts by weight, preferably about 5 to about 15 parts by weight per 100 parts by weight of the active material. The amount of conductive agent can be minimized since the active material used herein is well conductive. The binder is used in an amount of about 2 to about 25 parts by weight per 100 parts by weight of the active material.

The negative electrode active material which is a part of the secondary cell of the invention is lithium or a lithium alloy capable of occluding and releasing lithium. The lithium alloys used herein include alloys of lithium with at least one metal selected from the group consisting of Group IIa, IIb, IIIa, IVa, and Va metals, preferably alloys of lithium with at least one metal selected from the group consisting of Al, In, Sn, Pb, Bi, Cd, and Zn. The preferred alloys contain 30 to 80 atomic percents of lithium.

The electrolyte used in the secondary cell of the invention may be any desired nonaqueous electrolyte which is chemically stable to the positive and negative electrode active materials and allows lithium ions to migrate for electrochemical reaction with the positive and negative electrode active materials.

Some illustrative, non-limiting examples of the electrolyte are $LiPF_6$, $LiAsF_6$, $LiSbF_6$, $LiBF_4$, $LiClO_4$, $LiI$, $LiBr$, $LiCl$, $LiAlCl_4$, $LiHF_2$, $LiSCN$, $LiSO_3CF_3$, and mixtures thereof. Preferred among them are $LiPF_6$, $LiAsF_6$, and $LiClO_4$. The electrolyte is preferably present in a concentration of 1 to 6 mol/liter of solvent to be described below.

These electrolytes are generally used in solution form by dissolving in nonaqueous solvents. The preferred non-aqueous solvents used herein are relatively highly polar solvents. Examples include cyclic carbonates such as propylene carbonate, ethylene carbonate, and butylene carbonate; non-cyclic carbonates such as diethyl carbonate and dibutyl carbonate; glymes such as tetrahydrofuran, 2-methyltetrahydrofuran, dioxolan, dimethoxyethane, and diethylene glycol dimethyl ether; lactones such as γ-butyrolactone; phosphate esters such as triethyl phosphate; borate esters such as triethyl borate; sulfur compounds such as sulfolane and dimethyl sulfoxide; nitriles such as acetonitrile; amides such as dimethylformamide and dimethylacetamide; dimethyl sulfate, nitromethane, nitrobenzene, dichloroethane, and mixtures thereof. Preferred among them are mixtures of a cyclic carbonate such as propylene carbonate and ethylene carbonate and a non-cyclic carbonate such as diethyl carbonate. If desired, these solvents alone or in admixture may be combined with 3 to 10% by weight of an aromatic hydrocarbon such as benzene and toluene.

The secondary cell of the invention is generally constructed by interposing the electrolyte solution between the positive and negative electrodes. If desired, a separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics, nets and porous members of synthetic resins such as polytetrafluoroethylene, polyethylene, and polypropylene and natural fibers.

The cell of the present invention may be of any desired types including cylindrical cells with a spiral structure, coin, button, and paper types.

The nonaqueous electrolyte secondary cell of the invention has an increased capacity and a high potential and exhibits improved cycle performance and stable charge/discharge operation.

EXAMPLE

Examples of the present invention are given below by way of illustration and not by way of limitation. In the examples, mA is milliampere, V is volt, and H is hour.

EXAMPLE 1

A cell of the structure shown in FIG. 1 was fabricated.

FIG. 1 shows one typical coin type secondary cell to which the present invention is applicable. The cell includes a positive electrode 1 having a current collector 2 of stainless steel integrated therewith. The collector 2 is spot welded to a spacer 3 of sheet metal, which is, in turn, spot welded to the inner surface of a positive electrode casing segment 4. A negative electrode 5 is spot welded to a current collector 6 which is, in turn, secured to the inner surface of a negative electrode casing segment 7. A separator 8 in the form of porous polypropylene film is disposed between the positive and negative electrodes 1 and 5. The separator 8 is impregnated with an electrolytic solution. The positive and negative casing segments 4 and 7 are mated together to define a cell space for receiving the above mentioned components therein. An insulating annular gasket 9 is interposed between the casing segments 4 and 7 to form a seal therebetween.

The positive electrode was prepared by adding 1 mol of $Li_2CO_3$ and 0.1 mol of $SiO_2$ to 3 mol of $V_2O_5$. The mixture was thoroughly mixed and heated at 750° C. for reaction in air for 6 hours. There was obtained $Li_{1.03}V_3O_{7.9}$ containing an Si component. The product was crushed into powder. To 100 parts by weight of the powder were added 15 parts by weight of acetylene black as a conductive agent and 15 parts by weight of fluorocarbon resin powder as a binder. The mixture was fully mixed, kneaded with the aid of an organic solvent, roll milled into a sheet of about 100 μm thick, and then dried in vacuum at 150° C. A disk of a predetermined diameter was punched out of the sheet, which was ready for use as the positive electrode.

The negative electrode was prepared by punching a disk of a predetermined diameter out of lithium foil. The electrolytic solution was prepared by dissolving 1 mol/-liter of lithium hexafluorophosphate (LiPF$_6$) in a mixture of propylene carbonate and ethylene carbonate (volume ratio 1:1).

The thus fabricated cell of FIG. 1 had a diameter of 20.0 mm and a thickness of 1.6 mm.

The cell was repeatedly charged and discharged with a charge/discharge current of 1 mA, a discharge terminating voltage of 2.0 V, and a charge terminating voltage of 3.5 V. The capacity determined at the fifth cycle is shown in Table 1. The charge/discharge cycles were repeated until the discharge capacity was reduced to a half of the initial capacity. The specific capacity (mAH/g) was plotted relative to cycles in FIG. 2.

EXAMPLE 2

Li$_{1.09}$V$_3$O$_8$ containing an Al component was prepared by the same procedure as in Example 1 except that 0.1 mol of alumina (Al$_2$O$_3$) was used instead of the silica. Then the positive electrode was prepared by the same procedure as in Example 1. Then the cell was fabricated by the same same procedure as in Example 1 except that the electrolytic solution was prepared by dissolving 1 mol/liter of a mixture of lithium hexafluorophosphate (LiPF$_6$) and lithium perchlorate (LiClO$_4$) (molar ratio 1:1) in a mixture of propylene carbonate and ethylene carbonate (volume ratio 1:1).

The cell was subjected to the same charge/discharge cycle test as in Example 1. The fifth cycle capacity is reported in Table 1 and the cycle performance is plotted in FIG. 2.

Comparative Example

Li$_{1.05}$V$_3$O$_{7.85}$ was prepared by the same procedure as in Example 1 except that no silica was added. The positive electrode was prepared by the same procedure as in Example 1. The cell was then fabricated by the same procedure as in Example 1.

The cell was subjected to the same charge/discharge cycle test as in Example 1. The fifth cycle capacity is reported in Table 1 and the cycle performance is plotted in FIG. 2.

TABLE 1

|  | Specific capacity (mAH/g) | Positive electrode active material |
| --- | --- | --- |
| Example 1 | 226 | Li$_{1.03}$V$_3$O$_{7.9}$ (SiO$_2$) |
| Example 2 | 230 | Li$_{1.09}$V$_3$O$_8$ (Al$_2$O$_3$) |
| Comparative Example | 190 | Li$_{1.05}$V$_3$O$_{7.85}$ |

Figure 2:
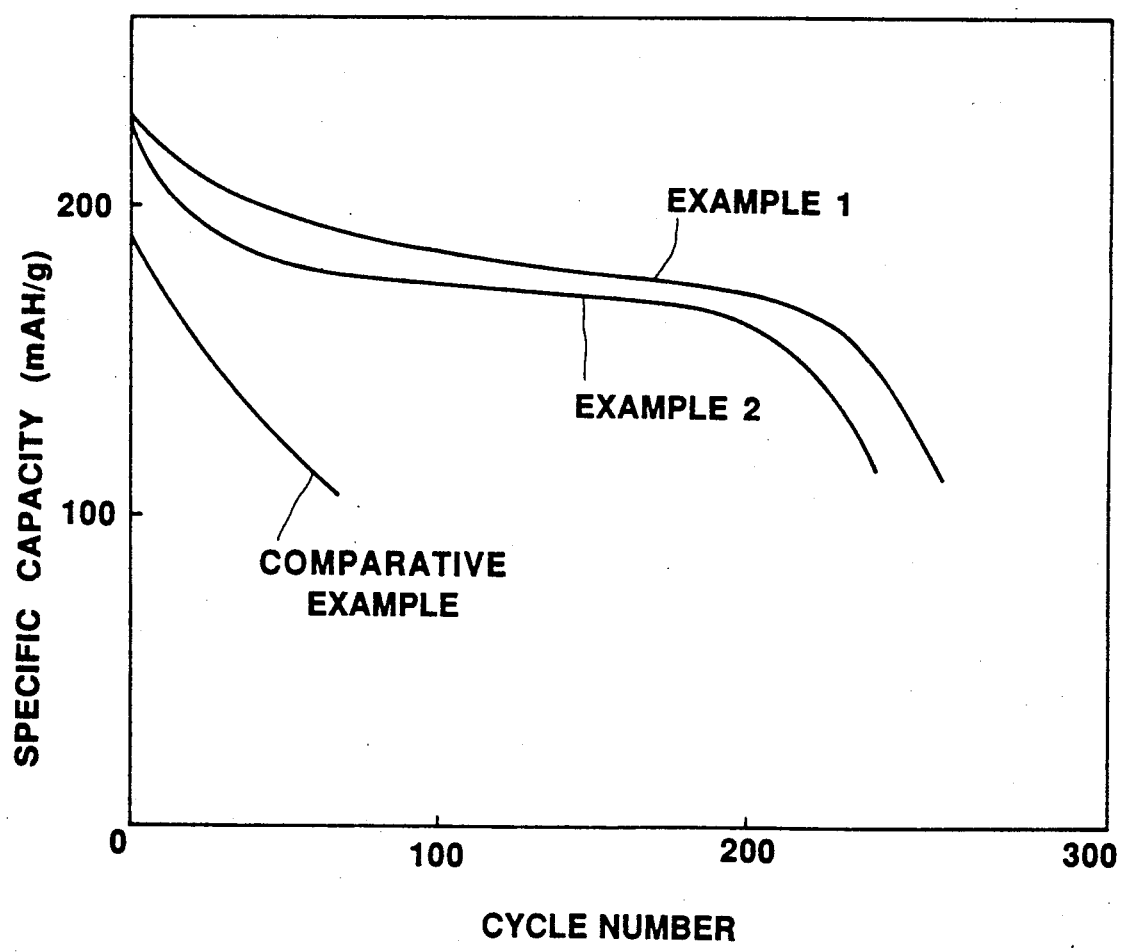
FIG. 2 is a graph showing the specific capacity vs. charge/discharge cycles of Examples 1 and 2 and Comparative Example.

As seen from Table 1 and FIG. 2, the secondary cells using Li$_{1+x}$V$_3$O$_{8+y}$ wherein $0 \leq x \leq 0.6$ and $-0.5 \leq y \leq 0.3$ containing an Si or Al component as the positive electrode active material have an increased capacity and improved cycle performance.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. In a nonaqueous electrolyte secondary cell comprising a positive electrode, a negative electrode of lithium or a lithium alloy, and a nonaqueous electrolytic solution containing lithium ions, the improvement wherein said positive electrode includes an active material in the form of a solid solution which is obtained by incorporating a SI or Al component into a lithium-containing vanadium oxide of the formula: Li$_{1+x}$V$_3$O$_{8+y}$ wherein $0 \leq x \leq 0.6$ and $-0.5 \leq y \leq 0.3$.

2. The cell of claim 1 wherein the Si component is elemental Si or SiO$_2$.

3. The cell of claim 1 wherein the Al component is elemental Al or Al$_2$O$_3$.

4. The cell of claim 1 wherein the amount of the Si or Al component is in the range of from 0.1 to 5 atoms % relative to the vanadium atoms.

5. The cell of claim 2 wherein the amount of the Si component is 0.5 to 2.0 atom % relative to the vanadium atoms.

6. The cell of claim 3 wherein the amount of the Al component is 2 to 4 atom % relative to the vanadium atoms.

* * * * *